(12) United States Patent
Yoaz et al.

(10) Patent No.: US 7,017,026 B2
(45) Date of Patent: *Mar. 21, 2006

(54) GENERATING LOOKAHEAD TRACKED REGISTER VALUE BASED ON ARITHMETIC OPERATION INDICATION

(75) Inventors: Adi Yoaz, Talmy-Menache (IL); Ronny Ronen, Haifa (IL); Stephan J. Jourdan, Portland, OR (US); Michael Bekerman, Campbell, CA (US)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

This patent is subject to a terminal disclaimer.

(21) Appl. No.: 10/848,602

(22) Filed: May 18, 2004

(65) Prior Publication Data

US 2004/0215934 A1 Oct. 28, 2004

Related U.S. Application Data (63) Continuation of application No. 09/473,976, filed on Dec. 29, 1999, now Pat. No. 6,742,112.

(51) Int. Cl.
*G06F 9/34* (2006.01)
(52) U.S. Cl. ...................................... 711/213; 712/208
(58) Field of Classification Search ................ 711/213, 711/219, 220; 712/208, 221, 225
See application file for complete search history.

(56) References Cited

U.S. PATENT DOCUMENTS

| | | | |
|---|---|---|---|
| 5,371,865 A | 12/1994 | Aikawa et al. | 711/125 |
| 5,377,336 A | 12/1994 | Eickemeyer et al. | 712/207 |
| 5,511,192 A | 4/1996 | Shirakihara | 718/106 |
| 5,768,610 A | 6/1998 | Pflum | 712/23 |
| 5,838,941 A | 11/1998 | Valentine et al. | 712/217 |
| 5,903,768 A | 5/1999 | Sato | 712/1 |
| 5,924,128 A | 7/1999 | Luick et al. | 711/220 |
| 6,240,503 B1 * | 5/2001 | Witt | 712/23 |

OTHER PUBLICATIONS

Yiannakis Sazeides, Stamatis Vassiliadis, James E. Smith, "The Performance Potential of Data Dependence Speculation & Collapsing", Proceedings of the $29^{th}$ Annual IEEE/ACM International Symposium on Microarchitecture, MICRO-29, Dec. 2-4, 1996, Paris, France, IEEE Computer Society Press, Los Alamitos, California, 1996 IEEE, 1072-4451/96, pp. 238-247.

José González, "Speculative Execution via Address Prediction and Data Prefetching", Proceedings of the 1997 International Conference on Supercomputing, Jul. 7-11, 1997, Vienna, Austria, ICS 97 Vienna Austria, 1997 ACM 0-89791-902-5/97/7, pp. 196-203.

Yiannakis Sazeides and James E. Smith, "The Predictability of Data Values", Proceedings of the Thirtieth Annual IEEE/ACM International Symposium on Microarchitecture, Dec. 1-3, 1997, Research Triangle Pk., United States, 1997 IEEE, 1072-4451/97, pp. 248-258.

(Continued)

*Primary Examiner*—Kenneth S. Kim
(74) *Attorney, Agent, or Firm*—Kenyon & Kenyon (57) ABSTRACT

Apparatus and methods to track a register value. A microprocessor can include a first register, a control circuit, and an adder. The first register can store a tracked register value. The control circuit can include an instruction input to receive at least a portion of an instruction and a first output to output an arithmetic operation indication. The adder can include a control input to receive the arithmetic operation indication, a first input to receive an immediate operand of an instruction, and a second input to receive the tracked register value.

20 Claims, 5 Drawing Sheets

OTHER PUBLICATIONS

Andreas Moshovos and Gurindar S. Sohi, "Streamlining Inter-operation Memory Communication via Data Dependence Prediction", Proceedings of the Thirtieth Annual IEEE/ACM International Symposium on Microarchitecture, Dec. 1-3, 1997, Research Triangle Pk., United States, 1997 IEEE, 1072-4451/97, pp. 235-245.

* cited by examiner

| SP STATE | EVENT | NEW SP STATE | ACTION |
|---|---|---|---|
| Known | 1. Memory Operation with Address Component Consisting of an SP and an Immediate Operand ("IMM") | Known | Early Address (EA) Resolution EA = Tracked SP +/- IMM |
| Known | 2. Memory Operation with an Address Component other than Event 1 | Known | No Early Address Resolution |
| Known | 3. Trackable SP-to-Immediate Arithmetic Operations that Modify the SP | Known | Updated Tracked SP = Tracked SP +/- IMM |
| Known | 4. Operations other than Event 3 that Modify the SP | Unknown | Record uOP Identifier Set $\Delta$ = 0, (Actual SP to be Returned by Execution Core) |
| Known | 5. A New SP Value is Received from the Execution Core after an Untrackable SP Modification is Executed | Known | Do Nothing with Received New SP Value |
| Known | 6A. A Pipeline Flush after a Branch Misprediction, when a Checkpointed SP is Known | Known | SP is Recovered from the Checkpoint |
| Known | 6B. A Pipeline Flush after a Branch Misprediction, when a Checkpointed SP is Unknown | Unknown | $\Delta$ is Recovered from the Checkpoint |
| Unknown | 1. Memory Operation with Address Component Consisting of an SP and an Immediate Operand ("IMM") | Unknown | No Early Address Resolution |
| Unknown | 2. Memory Operation with an Address Component other than Event 1 | Unknown | No Early Address Resolution |
| Unknown | 3. Trackable SP-to-Immediate Arithmetic Operations that Modify the SP | Unknown | $\Delta = \Delta$ +/- IMM |
| Unknown | 4. Operations other than Event 3 that Modify the SP | Unknown | Record uOP Identifier, Set $\Delta$ = 0, (Actual SP to be Returned by Execution Core) |
| Unknown | 5. A New SP Value is Received from the Execution Core after an Untrackable SP Modification is Executed | Known | Updated Tracked SP = Received SP + $\Delta$ |
| Unknown | 6A. A Pipeline Flush after a Branch Misprediction, when a Checkpointed SP is Known | Known | SP is Recovered from the Checkpoint |
| Unknown | 6B. A Pipeline Flush after a Branch Misprediction, when a Checkpointed SP is Unknown | Unknown | $\Delta$ is Recovered from the Checkpoint |

GENERATING LOOKAHEAD TRACKED REGISTER VALUE BASED ON ARITHMETIC OPERATION INDICATION

Related Applications

This application is a Continuation of U.S. Ser. No. 09/473,976 filed on Dec. 29, 1999, now U.S. Pat. No. 6,742,112.

FIELD OF THE INVENTION

Embodiments of the present invention relate to a register value tracker. More particularly, embodiment of the present invention relate to a register value tracker of a microprocessor.

BACKGROUND OF THE INVENTION

A known factor influencing microprocessor performance is load-to-use delay, i.e. the time required for a load instruction to fetch data from the memory hierarchy and to deliver it to the dependent instructions. With higher microprocessor frequencies, the relative performance cost of memory accesses is increased.

Techniques have been proposed to decrease the load-to-use latency. Certain techniques rely on past history of memory accesses to predict an address and perform a speculative memory request. One known technique is data prefetching. Data prefetching cuts the overall load-to-use latency by bringing likely-to-be-used data from distant memory to an upper level of the memory hierarchy ahead of time. However, data prefetching does not eliminate the load-to-use delay caused by accessing data residing in a first level data cache.

Another known technique is load-address prediction. The goal of address prediction is to speculate on the address of a load instruction during an early stage of the pipeline, and initiate the memory access earlier to hide the memory hierarchy latency. Prediction typically requires a recovery scheme in case of a misprediction, unless data delivery is performed after the address prediction is verified.

Speculative cache accesses are also known. Address generation can be sped up by speculatively performing a fast carry-free addition of the index portions of base and offset address components early in the cache access cycle. The full memory address is calculated in parallel to a speculative cache access. If the carry-free calculation of the index turns to be wrong, the cache access is re-executed. This scheme, when successful, can save one cycle of load latency.

In view of the foregoing, it can be appreciated that a substantial need exists for methods and apparatus which can advantageously track a register value to allow early resolution of a memory address.

SUMMARY OF THE INVENTION

Embodiments of the present invention include apparatus and methods to track a register value. A microprocessor can include a first register, a control circuit, and an adder. The first register can store a tracked register value. The control circuit can include an instruction input to receive at least a portion of an instruction and a first output to output an arithmetic operation indication. The adder can include a control input to receive the arithmetic operation indication, a first input to receive an immediate operand of an instruction, and a second input to receive the tracked register value.

BRIEF DESCRIPTION OF THE DRAWINGS

FIG. 3 illustrates the actions of a state machine in accordance with an embodiment of the present invention.

DETAILED DESCRIPTION

Embodiments of methods and apparatus to track a register value are described. In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

Higher microprocessor frequencies accentuate the performance cost of memory accesses. Embodiments of the present invention relate to methods and apparatus that can at least partially hide load-to-use latency by allowing the early issue of memory operations. Early memory operation address resolution can rely on register (e.g., stack pointer register) tracking to compute the address of memory operations in a frontend part of a processor pipeline. Register tracking enables decode-time computation of register values by tracking operations of the form <reg+/− immediate> (i.e., register value+/− immediate value). Register tracking can be performed in any pipeline stage following instruction decode and prior to execution.

Embodiments of the present invention can track varied register address values. A stack pointer tracker allows early resolution of stack address references by keeping track of the value of the stack pointer (SP). Early address resolution allows the issuing of stack memory operations (e.g., stack loads, stack stores, etc.) earlier, improving the load-to-use latency and increasing the instruction level parallelism. Absolute address tracking allows the early resolution of constant-address loads. Displacement based tracking relates to loads with addresses of the form <reg+/− immediate> by tracking the values of general-purpose registers.

Figure 1A:
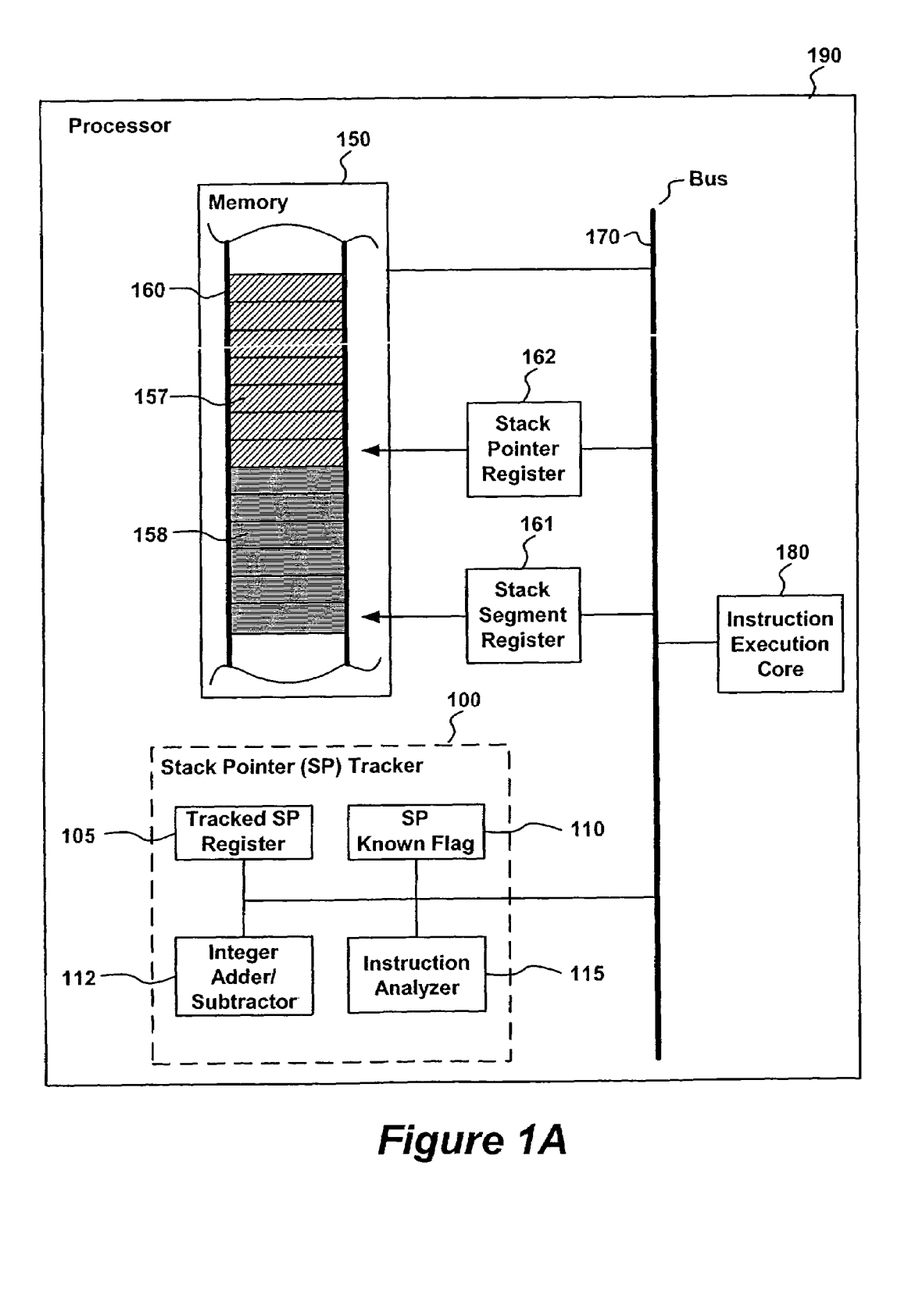
FIG. 1A shows an apparatus in accordance with an embodiment of the present invention.

FIG. 1A shows an apparatus in accordance with an embodiment of the present invention. Processor 190 can include an instruction execution core 180 and a memory 150 coupled via processor bus 170. The term "coupled" encompasses a direct connection and an indirect connection. Memory 150, in another embodiment, may be external to processor 190 and coupled via a bus. Memory 150 can include a stack area 160 including a stack 157 of stored data entries. Stack area 160 can include available data entry locations 158. The location of stack area 160 within memory 150 can be specified by a value stored in stack segment register 161. The current top of stack 157 can be identified by a value (e.g., address, offset, etc.) stored in stack pointer register 162.

Processor 190 can be a processor, such as the Pentium® III processor manufactured by Intel Corp. of Santa Clara, Calif. Pentium® is a registered trademark of Intel Corp. Processor 190 can be out-of-order superscalar processor including an instruction pipeline. Memory 150 includes a device adapted to store digital information, such as Static Random Access Memory (SRAM). Memory 150 can be internal to the processor 190, external to the processor 190, an internal cache memory, an external cache memory, etc.

Stack pointer tracker 100, in one embodiment, includes tracked SP register 105, an integer adder/subtractor 112, an SP known flag 110 (e.g., a bit memory location, a bit of a register, etc.), and an instruction analyzer 115 (e.g., a control circuit, dedicated logic, etc.). The stack pointer may be a 16-bit value, a 32-bit value, etc. In one embodiment, SP known flag 110 can be a one-bit memory location of instruction analyzer 115 and can indicate whether the SP value is known or unknown to the stack pointer tracker 100. Stack pointer tracker 100 can determine the address of a stack memory operation during an early stage of the instruction pipeline (e.g., after a decode stage of the pipeline) to allow an earlier initiation of memory access.

A stack memory operation can have as its address components an SP register and a displacement (e.g., add an immediate value, subtract an immediate value) specified by a micro-operation code (uOPCODE) of the instruction. The address of a stack memory operation can depend on the value of the SP register. Modifications to the SP register usually have a form of <SP=SP+/− immediate>, and thus can be tracked after being decoded. Furthermore, once the SP value is known at some point, the exact value of the SP register may be computed for certain consecutive instructions.

In one embodiment, stack pointer tracker 100 is located in the pipeline stage right after the instruction decode. Instruction analyzer 115 can inspect each instruction (e.g., a micro-operation or "uOP") to detect trackable instructions, e.g., uOPs modifying the value of the SP based on an immediate offset value, memory operation uOPs using the SP and an immediate offset for address calculation, etc. In one embodiment, the stack pointer tracker 100 processes uOPs in program order. Tracked SP register 105 can store the tracked value of the SP (i.e., the tracked SP). SP known flag 110 can indicate whether the SP value is known by the SP tracker (e.g., whether the SP value underlying a tracked SP value is known by the tracker). In one embodiment, the SP known flag 110 is set (e.g., one of a first predetermined potential $V_{cc}$, and ground, etc.) when the SP is known, and the SP known flag 110 is cleared (e.g., the other one of a first predetermined potential $V_{cc}$, and ground, etc.) when the SP is unknown.

When a trackable uOP modifying the SP value by an immediate value is detected by instruction analyzer 115 and the SP known flag 110 is set, the immediate value can be used to calculate an updated tracked SP value without waiting for the uOP to reach the execution stage of the pipeline. When the SP value is to be increased by the immediate value, integer adder/subtractor 112 can add the tracked SP value stored in tracked SP register 105 and the immediate value. The result (i.e., an updated tracked SP value) can be stored in the tracked SP register 105. Subsequent stack operations may use this updated tracked value of the SP. When all SP modifications are trackable, the tracked SP register can hold a tracked SP value that has been updated for all uOPs that have passed the stack pointer tracker 105. In one embodiment, the conditions for a trackable SP modification can include that: 1) the uOP is an ADD, SUB or MOV-immediate (e.g., move an immediate value into a register) uOP; 2) the SP is one of the source operands of an ADD or SUB uOP; 3) the second source operand is an immediate value; and 4) the SP register is the destination register.

Figure 1B:
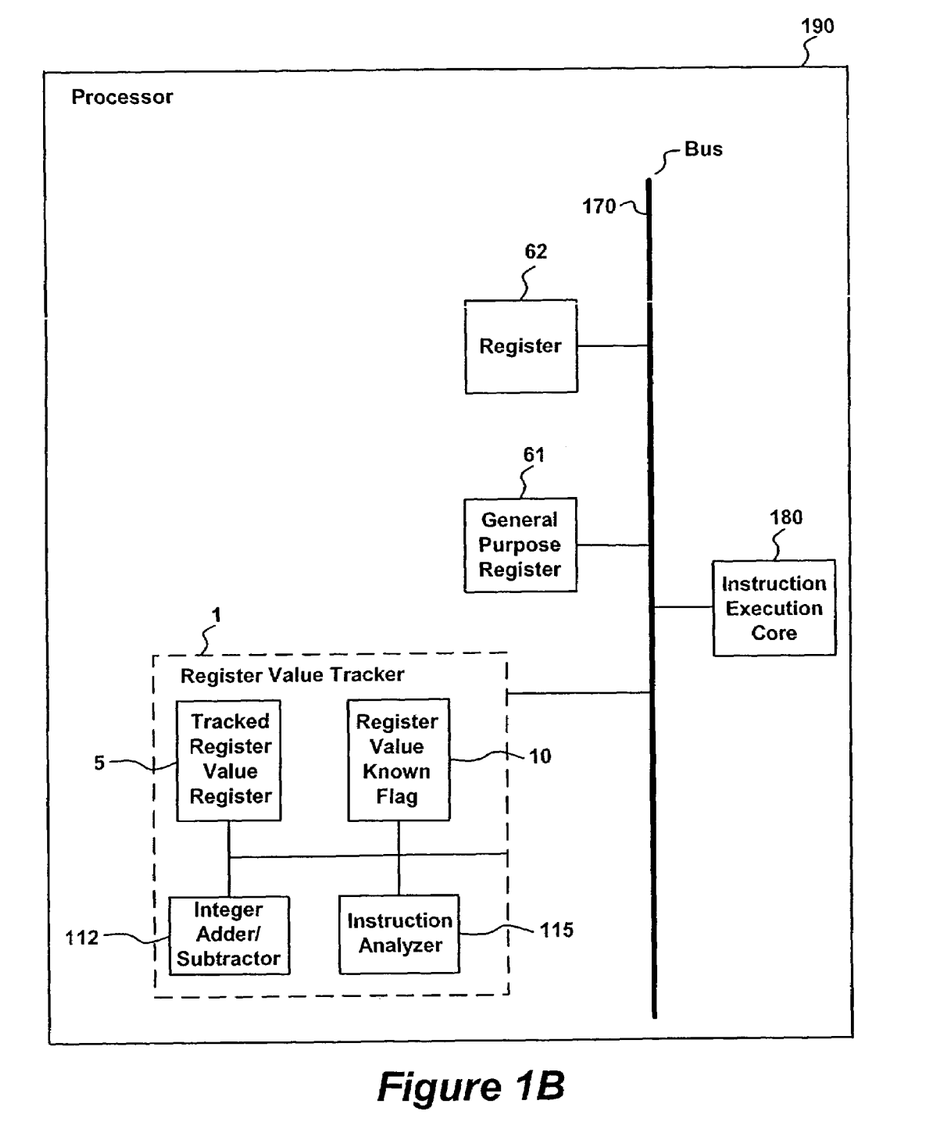
FIG. 1B shows an apparatus in accordance with an embodiment of the present invention.

FIG. 1B shows an apparatus in accordance with an embodiment of the present invention. Processor 190 can include an instruction execution core 180, a register 62, a general purpose register 61, and register value tracker 1 coupled via bus 170. Register tracker 100, in one embodiment, includes tracked register value register 5, an integer adder/subtractor 112, a register value known flag 10, and an instruction analyzer 115. In one embodiment, register value known flag 10 can be a one-bit memory location of instruction analyzer 115 and can indicate whether the register value is known or unknown to the register value tracker 1. In accordance with embodiments of the present invention, register value tracker 1 can determine the address of a memory operation during an early stage of the instruction pipeline (e.g., after a decode stage of the pipeline) based on a tracked register value to allow an earlier initiation of a memory access.

An embodiment of a register value tracker can be used to track values of all architectural registers. In such an embodiment, the register tracker can use a Latest Register Values (LRV) table to record the tracking-time values of all architectural registers. When a trackable operation on one of the known registers is recognized, the register tracker can perform the calculation, update the LRV, and mark the destination register as known. Since more than a single register can be tracked, the register tracker can handle uOPs with a destination register different from the source register(s). Trackable uOPs with respect to all architectural registers includes uOPs of the form <Reg2←Reg1+/−IMM>, where Reg1 and Reg2 are any registers.

Figure 2:
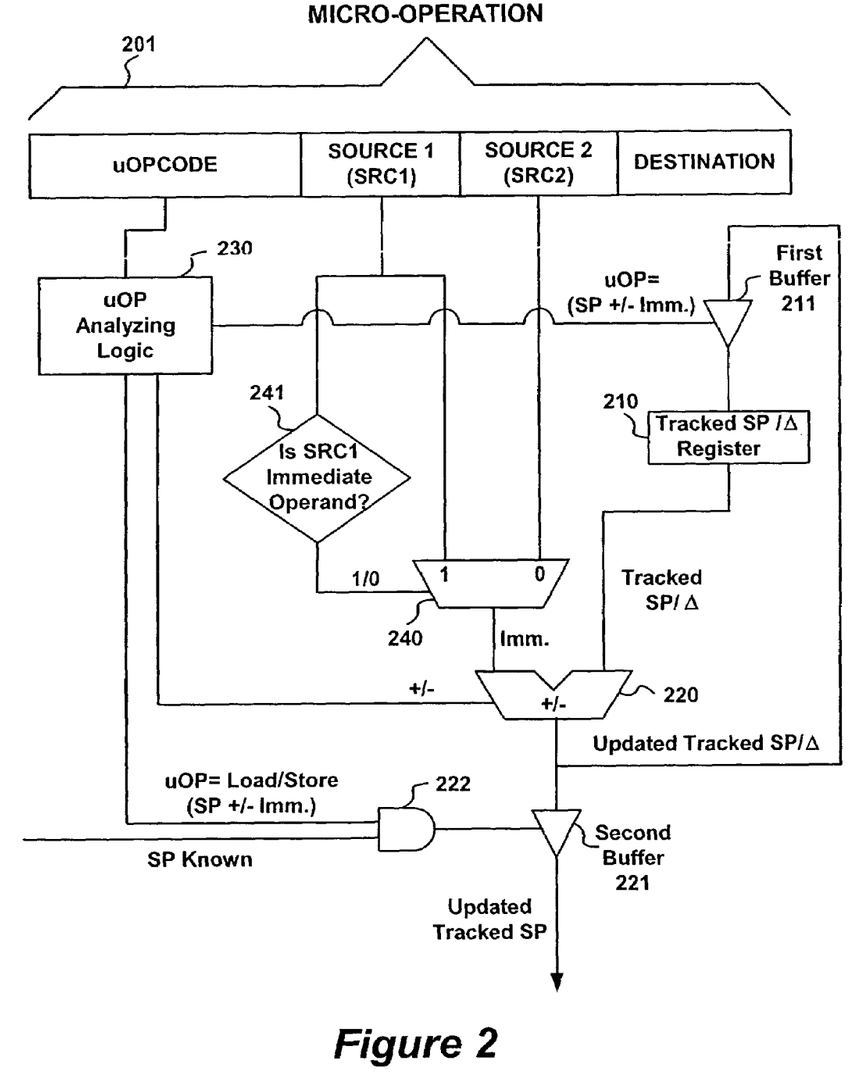
FIG. 2. shows an apparatus in accordance with an embodiment of the present invention.

FIG. 2. shows an apparatus in accordance with an embodiment of the present invention. In a pipelined processor, an instruction can be translated by the instruction decoder into a fixed-length micro-operation 201. The uOP can include a uOPCODE, a first source operand, a second source operand, and a destination of the microoperation action. uOP analyzing logic 230 can determine that a uOPCODE is one of the trackable uOPCODES and that the source operands are the SP value and an immediate value. Selector 240 (e.g., a multiplexer, etc.) and logic circuit 241 can select and output the immediate value (IMM) of the first source operand and the second source operand so that a first input of adder 220 receives the immediate value. For example, when the first source operand is an immediate value, then logic circuit 241 can output a control signal (e.g., a logical one). Based on that control signal, selector 240 can output the immediate value to the first input of adder 220.

A second input of adder 220 can receive the value stored in tracked SP/Δ register 210. When the SP is known, the tracked SP/Δ register 210 can store the tracked SP value. Adder 220 can add the immediate value to, or subtract the immediate value from, the tracked SP value received from tracked SP/Δ register 210 based on an arithmetic operation indication received from uOP analyzing logic 230. In one embodiment, adder 220 performs subtraction by adding the ones complement of the first input (e.g., a ones complement of the immediate value) to the tracked SP value with a carryin. The arithmetic operation indication (e.g., perform addition when high, perform subtraction when low) can be based on the uOPCODE of the uOP (e.g., ADD, SUB, etc.). Based at least in part on the received immediate value, the received tracked SP value, and the arithmetic operation indication, the adder 220 can generate and output the updated tracked SP.

When the uOP is a trackable instruction to modify the SP, the uOP analyzing logic can send a first buffer control signal to first buffer 211, and the updated tracked SP value can be stored in tracked SP/Δ register 210. In another embodiment, tracked SP/Δ register 210 can be a buffer, a location in memory, an entry in a table memory, a field of an entry in a memory, etc. When the uOP is a trackable instruction to perform a stack memory operation (e.g., a stack load, a stack store, etc.), the uOP analyzing logic 230 can generate a trackable memory operation indication. When the SP is known (e.g., an SP known flag is set) and the uOP analyzing logic 230 generates the trackable memory operation indication, an AND circuit 222 can send an control signal to second buffer 221 to output the updated tracked SP value generated by adder 220.

The updated tracked SP value output by buffer 221 can be used to issue memory operations (e.g., stack loads, stack stores, etc.) earlier, improving the load-to-use latency and increasing the instruction level parallelism. Knowledge of the current SP value may be utilized to calculate the effective addresses of stack loads after the instruction decode stage in the pipeline. Early resolution of stack load addresses can allow a stack load to be issued ahead of its dependent instruction(s), and mask the load-to-use latencies of accessing the first level (L1) or the second level (L2) data cache. Early stack load resolution can shorten the critical path and boost performance.

When the SP tracker detects an SP-modifying uOP that does not satisfy conditions of trackability (e.g., the four conditions described above), the tracked SP value cannot be updated. Such uOPs include complex operations on the SP, loads from memory into the SP register, and operations involving other registers and the SP register. In such cases, the stack pointer tracker can clear the SP known flag and record the sequence number identifier of the untrackable micro-operation. In one embodiment, a new status bit can be attached to each micro-operation to indicate whether the current operation modifies the SP value in an untrackable way. When a uOP is executed, the execution core can check this status bit and forward the new SP value to the SP register tracker when the status bit is set.

During the time interval between detecting the uOP related to an untrackable SP change and execution of that uOP, several additional uOPs that modify the SP value can have passed the SP tracker. The SP value received from the execution pipe stage does not reflect these changes. Therefore, when the SP known flag is clear (e.g., when the SP valve is unknown by the tracker), the stack pointer tracker can track the SP changes (i.e., the SP Δ's). When the SP is unknown, instead of updating a tracked SP value in the tracked SP/Δ register 210, the stack pointer tracker can calculate an SP Δ (e.g., an SP elapsed change, etc.). The SP Δ can provide the cumulative change to the value of an SP by the uOPs that passed the tracker since the SP known flag had been cleared.

When the SP value is unknown to the tracker, the SP tracker can perform actions similar to the actions performed when the SP is known, but instead of updating a tracked SP value, the SP tracker can operate on and update an SP Δ stored in the tracked SP/Δ register 210. This tracked SP Δ value can be added to an SP value received from the execution core to obtain the new tracked SP value.

In one embodiment, generation of an updated tracked SP value can allow early load address resolution when the SP value is known. For example, an updated tracked SP value output by an embodiment of the present invention can be used to initiate a data cache access in the frontend stages of the pipeline. The data cache access of an early resolved load (e.g., based on a tracked SP value) can overlap with the original load instruction's progress through the pipeline up to a reorder buffer allocation stage. Since early load address resolution based on an updated tracked SP value is reliable, an original load may not consume additional memory bandwidth. Instructions dependent on the early resolved load can be executed based on the early loaded data as soon as the cache access completes.

Tracked uOPs, in one embodiment, do not proceed past a reorder buffer write stage and a physical register allocation stage of a pipeline. Further, when a branch misprediction is detected, a correct tracked SP/Δ value can be recovered. In one embodiment, the tracked SP/Δ value and the SP known bit (e.g., flag) can be checkpointed on each branch. After a branch misprediction, when a checkpointed SP value is known, the tracked SP value can be recovered. When a checkpointed SP value is unknown, the tracked Δ can be recovered.

According to one embodiment of the present invention, more than a single instruction modifying the SP value can be decoded in a single cycle and the SP tracker can handle a number of concurrent SP modifications per cycle. The SP tracker may employ a two-level structure (e.g., similar to register renaming of a number of dependent instructions). For each incoming SP modification, the first stage selects an initial tracked SP value, e.g., the tracked SP value from the previous cycle, an outcome of one of the earlier tracked SP calculations performed at the same cycle, etc. The second stage can generate the tracked SP calculation using the initial tracked SP value. For certain timing constraints, a pipelined 2-cycle SP tracker can be implemented with the corresponding bypass paths.

The stack load tracker may use, in one embodiment, one or more dedicated ports to the data cache, in which case the resolved stack loads may proceed in parallel to other loads. To reduce the implementation cost, the data cache ports can be shared, and different requests from both the tracker and the regular memory pipeline can be arbitrated. A separate stack cache can allow stack load accesses to be performed in parallel to other loads while eliminating the cost of additional ports to the data cache. Early load address resolution can immediately initiates a data cache access. Advancing memory accesses can introduce structural hazards since they compete on the data cache ports with references processed by the conventional memory stage. In one embodiment, a stack cache can separate stack accesses from other load accesses.

For example, several smaller caches can be faster than a single large cache. Moreover, each distributed cache may work in parallel without requiring additional ports. Decoupling stack memory operations from other memory operations can be straightforward, e.g., only loads/stores that use the SP value as source address operands are redirected to a separate small cache, e.g., a stack cache. The stack cache and an L1 data cache can maintain mutually exclusive data, which can be achieved by maintaining a snooping mechanism to detect incorrect data placement. For example, when incorrect data allocation is found, the data is transferred to the appropriate cache. In an embodiment, memory consistency can be maintained in the stack cache as well as the L1 cache when accesses are snooped. In one embodiment, the stack cache is relatively small and may be designed for lower latency to reduce load-to-use delays even in case of untrackable loads.

FIG. 3 illustrates the actions of a state machine in accordance with an embodiment of the present invention. A stack pointer tracker, in one embodiment, can be in one of at least two states: (1) SP value is known, and (2) SP value is unknown. Events can cause the state machine to perform certain actions and change its state. In one embodiment, four events are triggered by incoming decoded uOPs:

EVENT 1. Memory operation with an address component consisting of an SP value and an immediate operand.

EVENT 2. Loads with an address component other than as in EVENT 1.

EVENT 3. Trackable SP-to-immediate arithmetic operations that modify the SP.

EVENT 4. Operations other than EVENT 3 that modify the ESP.

There are at least two asynchronous events, in one embodiment, that can be triggered by an execution core of a processor, including:

EVENT 5. A new SP value is received from the execution core after an untrackable SP modification is executed.

EVENT 6A. A pipeline flush after a branch misprediction, when a checkpointed SP value is known.

EVENT 6B. A pipeline flush after a branch misprediction, when a checkpointed SP value is unknown.

When the SP value is known and an SP-based memory operation [SP known, event 1] is recognized, the memory operation address can be based on early address resolution (i.e., based on the updated tracked SP value), and the memory operation (e.g., a load) can be issued to the cache. Early address resolution is not performed for other memory operations [SP known, event 2]. For trackable arithmetic operations that modify the SP value [SP known, event 3], an updated tracked SP value can be calculated based on the tracked SP value, the uOP's immediate value, and the uOPCODE of the uOP (e.g., ADD, SUB, etc.). When an untrackable SP modification [SP known, event 4] is recognized, the SP register tracker can record a uOP identifier, set the tracked Δ value to zero, and clear the SP known flag. If an additional untrackable uOP is received, an identifier of the additional untrackable uOP is recorded and the tracked Δ value can be reset to zero. When the SP value is known and a new SP value is received from the execution core after an untrackable SP modification instruction is executed, [SP known, event 5], the SP tracker does nothing with the new SP value. In the case of a pipeline flush after a branch misprediction, when the value of a checkpointed SP is known [SP known, event 6A], the SP value can be recovered from the checkpoint. In the case of a pipeline flush after a branch misprediction, when the value of a checkpointed SP is unknown [SP known, event 6B], the SP known flag can be cleared and the tracked Δ value can be recovered from the checkpoint.

When the SP value is unknown and an SP-based memory operation [SP unknown, event 1] or other memory operation [SP unknown, event 2] is recognized, no early address resolution can be performed. For trackable arithmetic operations that modify the SP value [SP unknown, event 3], an updated tracked SP Δ value can be calculated based on the tracked SP Δ value, the uOP's immediate value, and the uOPCODE of the uOP (e.g., ADD, SUB, etc.). When an untrackable SP modification [SP unknown, event 4] is recognized, the SP register tracker can record a uOP identifier and set the tracked SP Δ value to zero. If an additional untrackable uOP is received, an identifier of the additional untrackable uOP is recorded and the tracked SP Δ value can be reset to zero. When the SP value is unknown and a new SP value is received from the execution core after an untrackable uOP that matches the recorded uOP identifier is executed [SP unknown, event 5], the new SP value can be added to the tracked SP Δ value to generate a tracked SP value. In the case of a pipeline flush after a branch misprediction, when the value of a checkpointed SP is known [SP unknown, event 6A], the SP known flag can be set and the SP value can be recovered from the checkpoint. In the case of a pipeline flush after a branch misprediction, when the value of a checkpointed SP is unknown [SP unknown, event 6B], the tracked Δ value can be recovered from the checkpoint.

Figure 4:
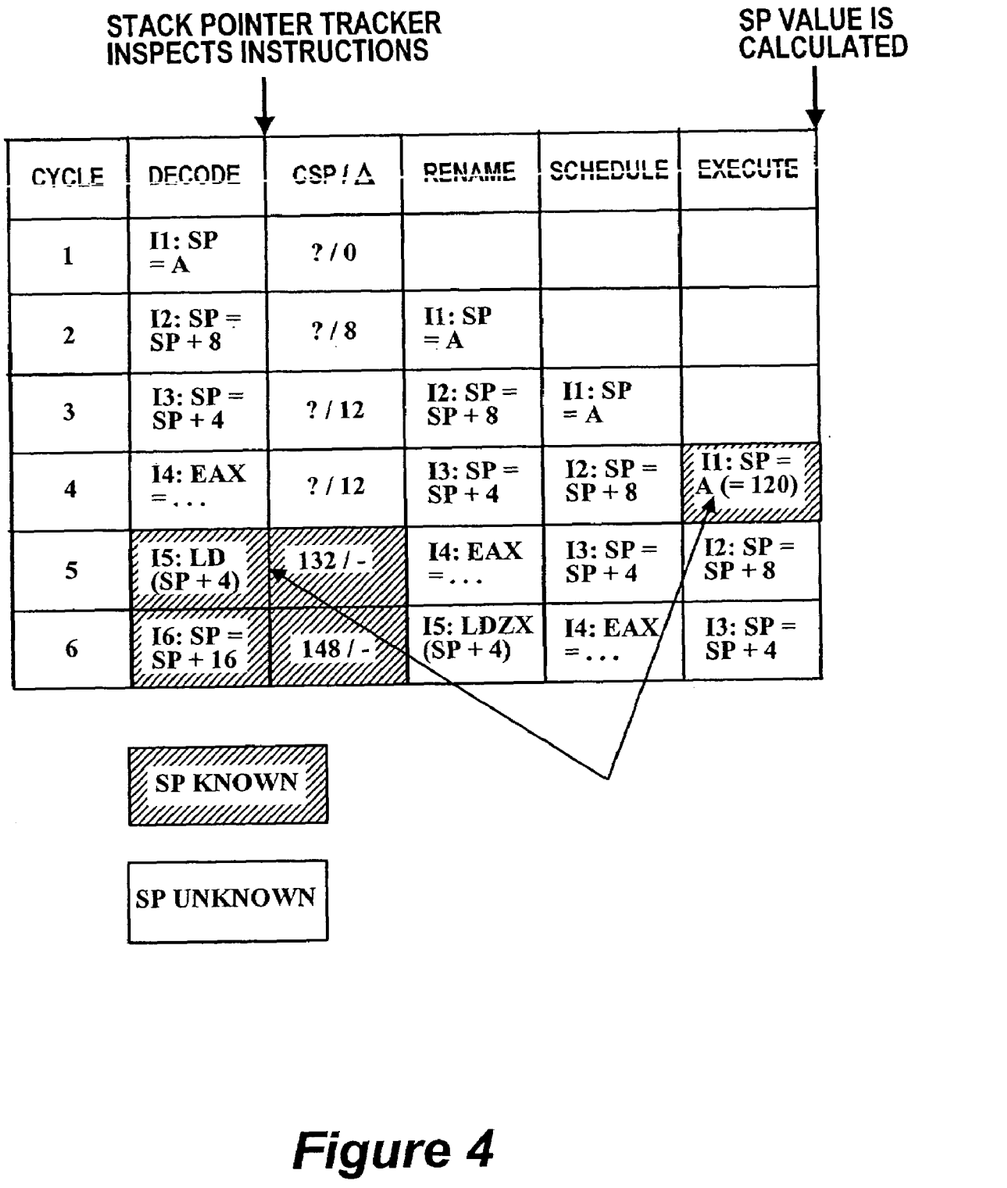
FIG. 4 shows a method in accordance with an embodiment of the present invention.

FIG. 4 shows a method in accordance with an embodiment of the present invention. More particularly, FIG. 4 illustrates the progress of micro-operations through a pipeline. One of the micro-operations can be one that modifies the stack pointer value in an untrackable way, e.g., loading the value of register A into the SP register. At cycle 1, an instruction is decoded into micro-operation I1, and the SP tracker inspects uOP I1. The SP tracker clears the SP known flag, resets the SP Δ stored in a tracked SP/Δ register to zero, records an identifier of uOP I1, and sets a status bit in uOP I1 to indicate that uOP I1 modifies the SP value in an untrackable way. At cycle 2, I1 progresses to a rename stage, and a uOP I2 is decoded. uOP I2 is a trackable uOP that modifies the SP by incrementing it by a value of 8. Accordingly, an updated tracked SP Δ is generated, and the tracked SP/Δ register now stores a value of 8. At cycle 3, I1 progresses to a schedule stage, and a uOP I3 is decoded. uOP I3 is a trackable uOP that increments the SP by a value of 4. Accordingly, the tracked SP/Δ register now stores a value of 12. At cycle 4, I1 is at the execution stage and the value of register A (=120) is loaded into the SP register. uOP I4 is decoded and is an uOP with which the SP tracker does nothing. Thus, the tracked SP/Δ register still stores a value of 12. The execution core examines the status bit of uOP and sends the determined value of the SP to the SP tracker. At cycle 5, the SP tracker receives the SP value (120), sets the SP known flag, and generates an updated tracked SP value based upon the received SP value (120) and the tracked SP Δ (12), and the updated tracked SP value (132) is stored in the tracked SP/Δ register. uOP I5 is decoded, which is a memory operation based upon a trackable modification of the SP (i.e., a load based upon the SP incremented by 4). The SP tracker generates an updated tracked SP value based upon the tracked SP value stored in the tracked SP/Δ register (132) and the immediate operand of the I5 uOP (4). The updated tracked SP value for the memory operation (136) can be used to issue the memory operation to a cache. At cycle 6, the decode stage decodes uOP I6, which is a trackable uOP that increments the SP by a value of 16. Accordingly, an updated tracked SP value is generated based at least in part on the value stored in the tracked SP/Δ register (132) and the immediate value of I6 (16), and the updated tracked SP value (148) is stored in the tracked SP/Δ register.

In accordance with one embodiment of the present invention, memory dependencies can occur when a load address matches the address of a preceding, in program order, store. A problem can arises when trying to re-order loads ahead of preceding stores. This problem, which has been termed memory ambiguity, can impair performance. Known memory dependency predictors can achieve high prediction accuracy so that load-store reordering can result in improved performance. Speculative memory disambiguation can be used to predict whether a load is dependent on a specific store prior to execution. An SP tracker can resolve reference addresses of stores, and the reference address of a store can be resolved earlier. Thus, information to determine whether an early resolved load can safely bypass prior stores can be provided. In the case of untrackable store addresses, an embodiment in accordance with the present invention does not allow succeeding loads to bypass prior stores.

In another embodiment, the SP tracker may be used to handle memory operations with absolute addressing mode. The addresses of such memory operations are comprised of a single component: the displacement. The address of these memory operations may be resolved in the frontend, and the memory operations may be issued earlier. In one embodiment, a register tracker allows null base component of the address in addition to SP.

In accordance with one embodiment of the present invention, instructions adapted to be executed by a processor to perform a method are stored on a computer-readable medium. The computer-readable medium can be a device that stores digital information. For example, a computer-readable medium includes a ROM as is known in the art for storing software (e.g., microcode). The computer-readable medium can be accessed by a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Methods and apparatus in accordance with embodiments of the present invention can advantageously provide early memory operation address resolution in the frontend part of the processor pipeline. A stack pointer tracker can reliably compute addresses of memory operations by utilizing decode-time information on address components. Early memory operation address resolution can use register value tracking to compute the values of general-purpose registers by tracking the outcomes of trackable operations. A register tracker can analyze decoded instructions and perform a specified arithmetic operation on the internal copy of the architectural register. In accordance with one embodiment, operations of the form <reg±immediate> are trackable. Untrackable register modifications can cause a register value tracker to interrupt early memory operations and to wait for a computed register value to be received from the execution core. When the register value is unknown, a register Δ value can be computed to track the register value modifications of all in-flight uOPs. Register tracking can be performed in pipeline stages after the instruction decode. Resolving memory references early in the frontend pipeline may be useful to partially hide load-to-use latencies in accessing lower levels of the memory hierarchy.

In the foregoing detailed description, apparatus and methods in accordance with embodiments of the present invention have been described with reference to specific exemplary embodiments. Accordingly, the present specification and figures are to be regarded as illustrative rather than restrictive.

We claim:

1. A method comprising:
   determining that a first instruction being sent from an instruction decoder to an instruction execution core is a trackable first instruction including a register value as a first source operand and an immediate value as a second source operand; and
   inputting a tracked register value and the immediate value into an adder;
   sending from a control circuit to the adder an indication of an arithmetic operation based on a portion of the first instruction; and
   performing the arithmetic operation with the adder on the tracked register value and the immediate value to generate an updated tracked register value.

2. The method of claim 1, the method further comprising storing the updated tracked register value.

3. The method of claim 1, the method further comprising:
   determining that the register value is known; and
   outputting the updated tracked register value.

4. The method of claim 3, the method further comprising performing a memory operation based at least in part on the updated tracked register value.

5. The method of claim 1, wherein the trackable first instruction is an instruction to modify the register value based at least in part on an arithmetic operation including the register value and the immediate value.

6. The method of claim 1, wherein the tractable first instruction is a memory operation instruction based at least in part on an arithmetic operation including the register value and the immediate value.

7. The method of claim 6, wherein the memory operation instruction is a memory store instruction.

8. The method of claim 6, wherein the memory operation instruction is a memory load instruction.

9. The method of claim 1, wherein:
   the register value is a stack pointer register value; and
   the tracked register value is a tracked stack pointer register value.

10. The method of claim 1, the method further comprising:
    determining that a second instruction is an untrackable second instruction;
    setting an indication that the register value is unknown; and
    storing an initial tracked register change value.

11. A computer-readable medium storing a plurality of instructions to be executed by a processor to implement a method of tracking a register value, the method comprising:
    determining tat a first instruction being sent from an instruction decoder to an instruction execution core is a trackable first instruction including a register value as a first source operand and an immediate value as a second source operand; and
    inputting a tracked register value and the immediate value into an adder;
    sending from a control circuit to the adder an indication of an arithmetic operation based on a portion of the first instruction; and
    performing the arithmetic operation with the adder on the tracked register value and the immediate value to generate an updated tracked register value.

12. The stored method of claim 11, the method further comprising storing the updated tracked register value.

13. The stored method of claim 11, the method further comprising:
    determining that the register value is known; and
    outputting the updated tracked register value.

14. The stored method of claim 13, the method further comprising performing a memory operation based at least in part On the updated tracked register value.

15. The stored method of claim 11, wherein the trackable first instruction is an instruction to modify the register value based at least in part on an arithmetic operation including the register value and the immediate value.

16. The stored method of claim 11, wherein the trackable first instruction is a memory operation instruction based at least in part on an arithmetic operation including the register value and the immediate value.

17. The stored method of claim 16, wherein the memory operation instruction is a memory store instruction.

18. The stored method of claim 16, wherein the memory operation instruction is a memory load instruction.

19. The stored method of claim 11, wherein:
the register value is a stack pointer register value; and the tracked register value is a tracked stack pointer register value.

20. The stored method of claim 11, the method further comprising:
determining that a second instruction is an untrackable second instruction;
setting an indication that the register value is unknown; and
storing an initial tracked register change value.

* * * * *

UNITED STATES PATENT AND TRADEMARK OFFICE
CERTIFICATE OF CORRECTION

PATENT NO. : 7,017,026 B1 Page 1 of 1
APPLICATION NO. : 10/848602
DATED : March 21, 2006
INVENTOR(S) : Adi Yoaz et al.

It is certified that error appears in the above-identified patent and that said Letters Patent is hereby corrected as shown below:

TITLE PAGE:
Item (73) Assignee: "SAE Magnetics (H.K.) Ltd., Shatin (HK)"

should be: --Intel Corporation, Santa Clara, California--

Signed and Sealed this

Nineteenth Day of December, 2006

JON W. DUDAS
*Director of the United States Patent and Trademark Office*